US010221021B2

(12) United States Patent
Koster et al.

(10) Patent No.: US 10,221,021 B2
(45) Date of Patent: Mar. 5, 2019

(54) CHAIN CONVEYOR WITH FREE-ROTATING ROLLERS AND RETRACTABLE FLIGHTS

(71) Applicant: MOBA GROUP B.V., Barneveld (NL)

(72) Inventors: Eric Koster, Barneveld (NL); Bart Van Walderveen, Barneveld (NL)

(73) Assignee: MOBA GROUP B.V., Barneveld (NL)

( * ) Notice: Subject to any disclaimer, the term of this patent is extended or adjusted under 35 U.S.C. 154(b) by 3 days.

(21) Appl. No.: 15/578,461

(22) PCT Filed: Jun. 3, 2016

(86) PCT No.: PCT/NL2016/050400
§ 371 (c)(1),
(2) Date: Nov. 30, 2017

(87) PCT Pub. No.: WO2016/195497
PCT Pub. Date: Dec. 8, 2016

(65) Prior Publication Data
US 2018/0162657 A1    Jun. 14, 2018

(30) Foreign Application Priority Data

Jun. 5, 2015    (EP) .................................... 15001674

(51) Int. Cl.
| | |
|---|---|
| *A01K 43/00* | (2006.01) |
| *B65G 17/06* | (2006.01) |
| *B65G 17/24* | (2006.01) |
| *B65G 39/20* | (2006.01) |
| *B65G 47/84* | (2006.01) |

(52) U.S. Cl.
CPC ............ *B65G 47/841* (2013.01); *A01K 43/00* (2013.01); *B65G 17/063* (2013.01); *B65G 17/24* (2013.01);
(Continued)

(58) Field of Classification Search
CPC ................. B65G 47/841; B65G 39/20; B65G 2201/0208; B65G 2201/025; B65G 15/42;
(Continued)

(56) References Cited

U.S. PATENT DOCUMENTS 5,038,921 A * 8/1991 Hoppmann ............ B65G 15/00
                                                            198/779
5,638,659 A    6/1997 Moncrief et al.
(Continued)

FOREIGN PATENT DOCUMENTS

| DE | 2046128 | 5/1971 |
|---|---|---|
| NL | 1021084 | 1/2004 |

OTHER PUBLICATIONS

International Search Report for PCT/NL2016/050400, dated Oct. 7, 2016.
(Continued)

*Primary Examiner* — Mark A Deuble
(74) *Attorney, Agent, or Firm* — Marvin Petry; Stites & Harbison PLLC

(57) ABSTRACT

The present invention relates to an endless conveyor for transporting products, for example packaging units, along a transport path in a transport direction T, wherein the conveyor comprises: •freely rotating supporting rollers (2) which extend substantially perpendicular to the transport direction, which are connected at both ends to conveyor elements (3), and which form an endless transport surface, and •flights (4), connected to the conveyor at well-defined positions, which with a control are movable to and away from a carrying position above the transport surface, wherein, after such carrying position has been taken up, a product present on the transport surface is carried along in the transport direction T, wherein the flights comprise strip-shaped thresholds (41) which, from a rest position below at least the transport surface, can be moved up between the
(Continued)

Figure 1:
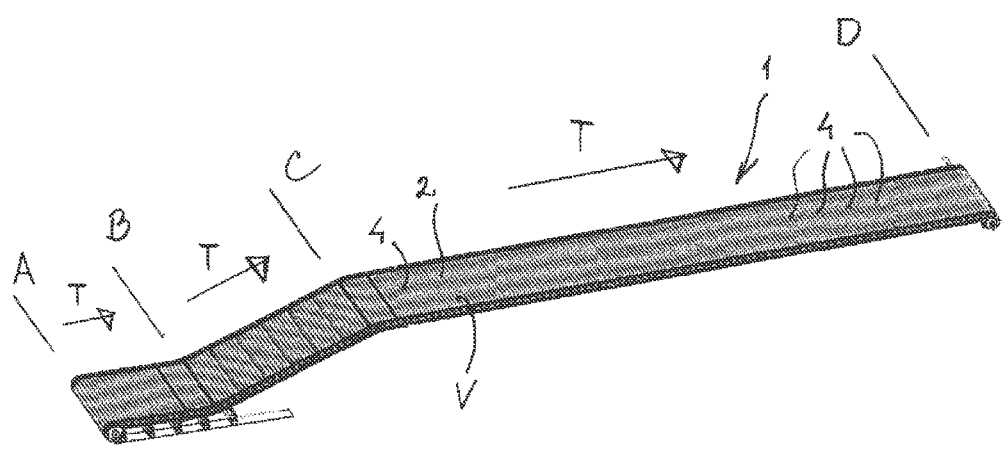

rollers to the carrying position. Suitable to carry and buffer along products over an incline and thus transport them.

20 Claims, 3 Drawing Sheets

(52) U.S. Cl.
CPC ........ *B65G 39/20* (2013.01); *B65G 2201/025* (2013.01); *B65G 2201/0208* (2013.01)

(58) Field of Classification Search
CPC ........ B65G 15/44; B65G 17/16; B65G 17/18; B65G 17/46; B56G 17/24
USPC ...................................... 198/779, 690.2, 697
See application file for complete search history.

(56) References Cited

U.S. PATENT DOCUMENTS

| | | | | |
|---|---|---|---|---|
| 6,318,544 | B1 * | 11/2001 | O'Connor | B65G 17/24 198/779 |
| 7,311,192 | B2 * | 12/2007 | Fourney | B65G 17/24 198/345.3 |
| 7,775,345 | B2 * | 8/2010 | Fourney | B65G 17/24 198/779 |
| 8,365,902 | B2 * | 2/2013 | Costanzo | B65G 17/24 198/779 |
| 8,544,634 | B2 | 10/2013 | Fourney et al. | |
| 8,944,236 | B2 * | 2/2015 | Fourney | B65G 13/06 198/459.6 |
| 9,302,850 | B2 * | 4/2016 | Fiore | B65G 13/02 |
| 2001/0017254 | A1 | 8/2001 | Geus et al. | |
| 2006/0154791 | A1 | 7/2006 | Reuteler et al. | |
| 2009/0111434 | A1 | 4/2009 | Yu et al. | |
| 2010/0200365 | A1 | 8/2010 | Pressler et al. | |
| 2012/0241292 | A1 | 9/2012 | Fourney et al. | |
| 2014/0116853 | A1 * | 5/2014 | Chinnock | B65G 17/24 198/779 |

OTHER PUBLICATIONS

Written Opinion of the International Searching Authority for PCT/NL2016/050400, dated Oct. 7, 2016.

* cited by examiner

CHAIN CONVEYOR WITH FREE-ROTATING ROLLERS AND RETRACTABLE FLIGHTS

The present invention relates to an endless conveyor with flights.

Such a conveyor is known, for example, from U.S. Pat. No. 5,638,659. In this document it is described in respect of the FIGS. 4 A-C how a conveyor belt is composed of several types of supporting elements jointly making up a substantially horizontal transport surface. With these different types, at well-defined positions, openings are provided in which flights can be raised. Furthermore, it is elucidated in this document how these flights divide well-defined products and groups of products, e.g. bottles, up into portions and carry these along.

What is realized with such a conveyor is that such products are in actual fact separated from each other and are carried along in the desired manner.

A further flighted conveyor is described in EP1064210. In this document the flights are part of the conveyor surface, this conveyor being typified as modular in construction. These flights can thus, as part of the surface, be raised to their carrying position. Such raising is brought about by a guide system. In NL1021084 of the same applicant, a similar conveyor is described, with the flight part of the conveyor belt extending throughout the width of the conveyor belt.

Conveyors with freely rotating rollers as transport surface are generally known in the field of transporting packaging units. Thus, in Applicant's grader type MOBA®2500, discharge tracks of this type for packaging units are used. What is achieved with them is that, upon a varying supply of packaging units, after these have been filled with the desired selection of eggs, no stagnation occurs. In particular upon large supply, these units will follow one after the other so fast that intermediate distances on the conveyor will be small. In horizontal partial paths, more particularly just before handover to a next conveyor, the freely rotating rollers make it possible to further reduce, or actually eliminate, the intermediate distances, and thus they provide the possibility of buffering an appreciable number of packaging units.

As represented in the brochure "Egg grading MOBA 2500" according to www.moba.nl, such conveyors, when discharging the packaging units, e.g. egg boxes of the type 2×3, 2×5, 2×6, etc., follow a route that rises slightly to thus arrive at the proper processing height for manual processing.

It has been found that for these situations and such materials and masses, only very gentle gradients, of up to 5° at a maximum, are possible without the packaging units thereby sliding back down again.

To those skilled in the art it will be clear that this entails major limitations in the use of such conveyors.

In order to improve the processing of especially packaging units such as the egg boxes mentioned, the endless conveyor according to the invention, in particular for transporting products such as the packaging units mentioned along a transport path in a transport direction T, is characterized by the features of claim 1.

Advantageously, the conveyor includes:
freely rotating supporting rollers which extend substantially perpendicular to the transport direction, which are connected at both ends to conveyor elements, and which form a transport surface, and
flights, connected to the conveyor at well-defined positions, which with a control are movable to and away from a carrying position above the transport path, wherein, after such carrying position has been taken up, a product present on the transport surface is carried along in the transport direction T, wherein the flights comprise strip-shaped thresholds which from a rest position below at least the transport surface can be moved up between the rollers to the carrying position.

With great advantage, for the purpose of processing such packaging units, processing possibilities can be realized allowing heights on the one hand and lengths for buffering on the other to be varied over a wide range.

The conveyor is particularly suitable to carry products along over an incline and thus transport them, as well as to buffer them where necessary.

Further advantageous elaborations of the invention are described in the subclaims.

Figure 2:
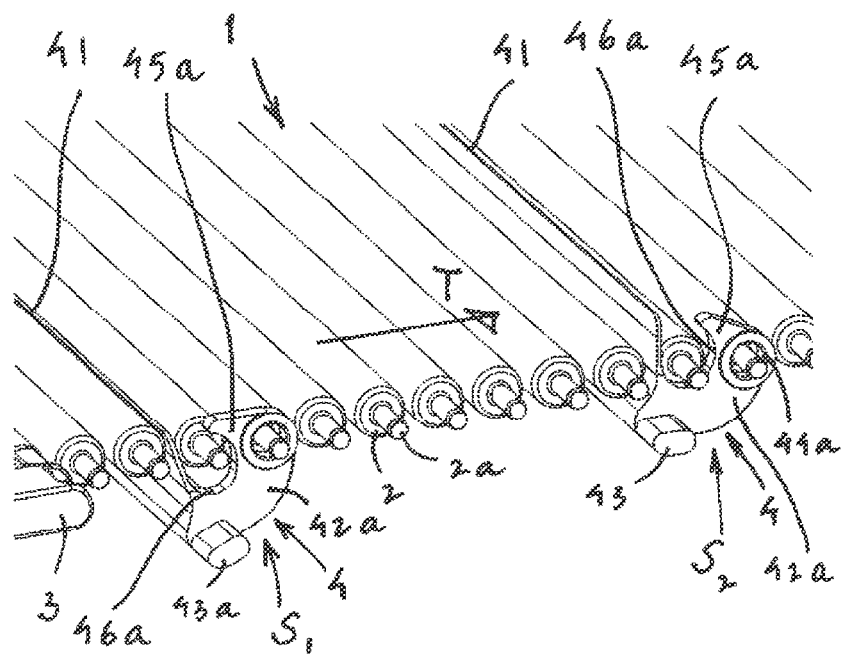
Figure 3:
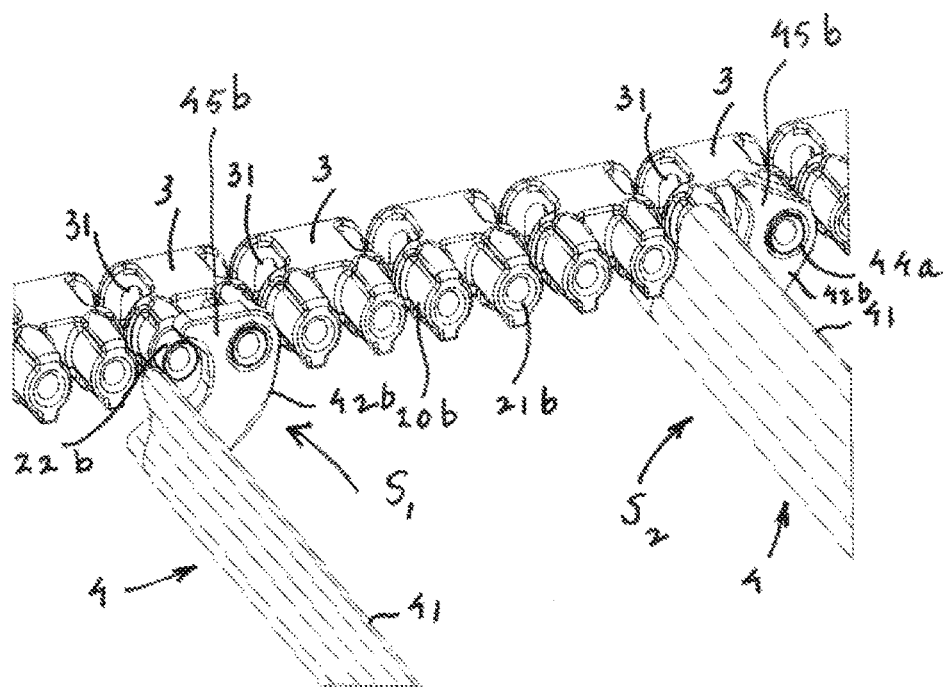
Figure 4:
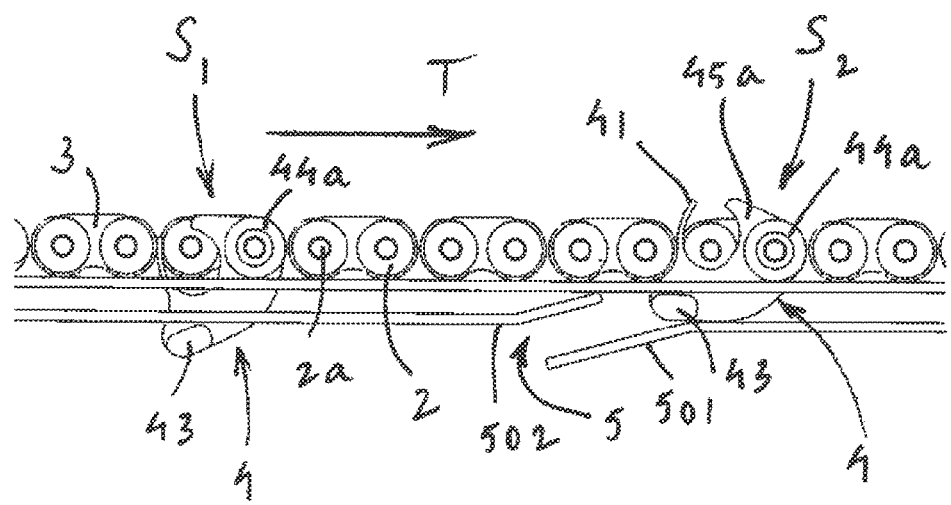
Figure 5:
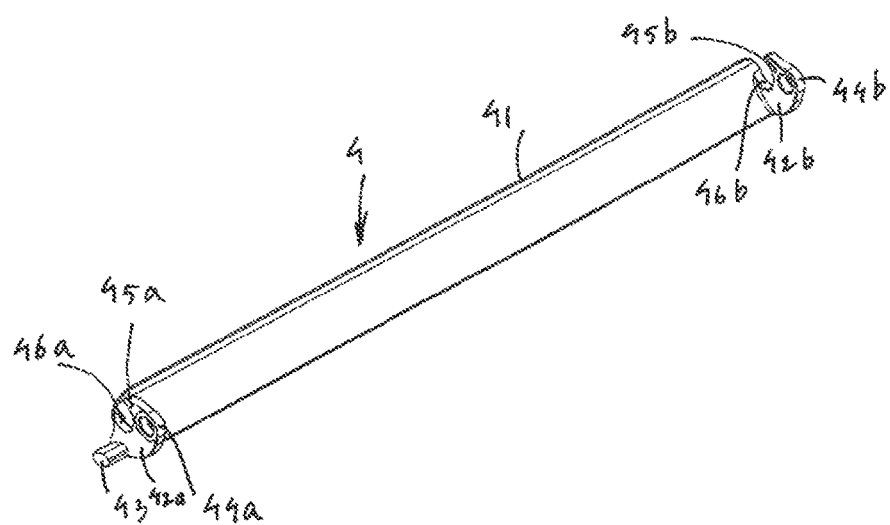

An example of a conveyor according to the present invention will hereinafter be described and elucidated with reference to a drawing, in which:

FIG. 1 gives a general view of such a conveyor,

FIG. 2 gives a detail in isometric view of the conveyor with an exemplary embodiment of the present invention in it, FIG. 3 gives another detail in isometric view of the conveyor of this exemplary embodiment, FIG. 4 shows a part of the conveyor in side view, and FIG. 5 shows in isometric view the threshold according to the invention.

For the same parts and representations in the various FIGURES, the same numerals and symbols have been used.

The drawings show an example of an endless conveyor 1 for transporting products (not shown), e.g. packaging units, along a transport path in a transport direction T. The conveyor 1 is provided with supporting rollers 2 rotating freely (about respective axes), which extend substantially perpendicular to the transport direction, and which are connected at both ends to conveyor elements 3, and form a transport surface V.

The conveyor elements 3 can for instance be part of, or be connected to, endless drive elements, for example, driven chains, which can extend along either side of the supporting rollers 2, to move the rollers 2 along the transport path. It will be clear that a drive of the rollers 2 can also be implemented in a different manner. As follows from the drawing, neighboring rollers 2 may be spaced a relatively short distance from each other (and thereby define a narrow intervening gap), for example a distance that is less than an outer diameter of the rollers 2.

The conveyor 1 is further provided with a number of flights 4, which, in particular, are placed at predetermined positions with respect to the rollers 2. The conveyor 1 includes a control, discussed in more detail hereinbelow, for regulating the position of the flights 4, so that they are movable between a product carrying position (in which the respective flight 4 extends above the transport surface V to carry along a product that is on the rollers 2 in the transport direction T) and a clearance position in which the respective flight 4 does not extend above the transport surface V. With great advantage, the flights 4 comprise strip-shaped thresholds. As is elucidated in more detail below, these thresholds can be moved up by the above-mentioned control from rest positions (below at least the above-mentioned transport surface V) between the rollers 2 to the above-mentioned carrying positions, in particular just before the flights following a substantially horizontal transport part (AB) reach an inclined part (BC). As is further elucidated hereinbelow, these thresholds can further be brought by the above-mentioned control from the carrying positions back to the rest positions, in particular just after the flights following an inclined part (BC) reach a horizontal transport path (CD) again.

In particular, in FIG. 1 a view is shown of the endless conveyor 1 which can transport in a transport direction T products resting on a transport surface V that comprises freely rotating rollers 2 (at least, a transport surface V that is defined by these rollers 2). In the exemplary embodiment represented here, the conveyor 1 follows a transport path ABCD of which the parts AB and CD are substantially planar (in particular substantially horizontal) and the part BC (which extends between parts AB and CD) follows a slope upwards. More particularly, flights 4 are indicated. In FIG. 1 the positions of the flights 4 in the partial path BC are more clearly identifiable than in the two further, planar paths AB and CD, respectively. The configuration is such that the flights 4 in partial path BC can take up a carrying position and thereby end up/project above the transport surface V, while in the planar parts AB and CD of the path the flights 4 can take up a rest position in which they are located (just) below the transport surface V. This is shown in the FIGURE, with thick and less thick black lines, respectively.

To those skilled in the art it will be clear that dimensions, distances, and materials for the parts used, can vary depending on the application. For instance, parts of the conveyor may follow one or more slopes down, or both kinds of slopes, that is, one or more slopes up and one or more slopes down, or even several slopes in succession. Also, smaller or larger portions of the conveyor 1 between the flights 4 may be open, for instance if the products to be transported, e.g. boxes or crates, have dimensions that make it unnecessary to fill up these portions completely. To that end, the arrangement may be such that, for instance, various roller positions, defined by conveyor elements 3, for placing/holding rollers 2 are not provided with transport rollers 2, so that relatively large openings are obtained in the transport surface (in particular openings of a length, measured in the transport direction T, that is greater than one or more diameters of the rollers 2).

Furthermore, it will be clear that such a conveyor 1 may be driven by, for instance, driven end wheels, which are not indicated in this FIG. 1, at at least one of its ends (return parts).

The FIGS. 2 and 3 show in detail the same or matching parts of the conveyor 1 in isometric view. Of a continuous surface part, the rollers 2 are represented, of which a single one, on the extreme left in FIG. 2, is coupled to a conveyor element (link) 3, while for the other rollers the conveyor elements 3 have been omitted in FIG. 2 so as to provide, for the purpose of further explanations, a better view of parts that make up the conveyor 1.

The conveyor elements 3 (see the single conveyor element 3 represented here in FIG. 2 for one of the two sides) form coupling pieces between, on the one hand, endless chains (also not shown), and, on the other hand, further parts of the conveyor 1, viz., the rollers 2 and the flights 4.

These conveyor elements 3 are shown in more detail in FIG. 3, with slots (passages) 31 by which they are coupled to a respective endless chain, at least, on that side of the conveyor 1, the chain itself not being represented. While in FIG. 2 both a plurality of rollers 2 and two flights 4 are shown, FIG. 3 only shows two flights.

In FIG. 3 there are furthermore depicted for one of these conveyor elements 3:
shaft holders 20a, b for receiving roller shafts 2a, b in shaft holes 21a, b, and bushes or shaft bushes 22a, b which can be inserted into bush holes 44a, b of the flights 4 and enable the free rotation of the flights 4 on these bushes 22a, b. As follows from the drawing, each of the conveyor elements 3 in this example is provided with a limited number of shaft holders 20a, 20b (viz., two) for holding a limited number of rollers 2 (likewise two).

It is noted that in this exemplary embodiment two types of conveyor elements 3 are used, since each conveyor element is provided with shaft holders 20a, b for the rollers, while a limited number also comprise shaft bushes 22a, b for the flights. To those skilled in the art it will be clear that other possibilities and simplifications can also be realized. Further, the configuration in this example is such that pivots of coupling brackets 42a, 42b of the flights 4 coincide with rotation axes of rollers 2 (in particular in that the shaft bushes 22a, 22b are formed concentrically on respective shaft holders 20a, 20b).

More in detail, according to FIGS. 2 and 3, the conveyor 1 comprises flights 4 with, for each flight 4, a threshold 41, which is either in a first situation S1 called a rest position with the threshold below the transport surface, or in a second situation S2 called a carrying position in which the threshold 41 projects at least partly above the transport surface (to be able to support and carry along a product sitting on the conveyor, in particular upon transport along an incline as mentioned). Such a flight 4 comprises on both sides of the conveyor 1 a bracket 42a, 42b by which the flight 4, via an above-mentioned bush hole 44a, 44b, is (pivotably) connected to a conveyor element 3. There is further represented a sideways projecting operating element, in this example a pin 43 which in this example can be operated by a control 5 as mentioned, in particular can be moved up by that control through a pushing movement, and thereby brings the threshold 41 in the second situation S2. In this example, outer sides of shaft holders 20a, 20b (or associated shaft bushes thereof) function as a stop for determining at least an end position (in this case the initial situation S1) of the two pivoting brackets 42a, 42b of a threshold 41 to be operated. In this example, with an open bush slot 46a of the bracket 42a, room is provided to rotate the bracket 42a along an adjacent bush 22a; a stop 45a of that bracket 42a rests in the rest position S1 on this adjacent bush 22a, which determines this rest position S1. This is represented in FIG. 3 for this situation S1, bush 22b and bracket 42b.

In this exemplary embodiment, the pin 43 is always in a plane that is substantially parallel to the transport surface. Other alignments can also be chosen and, accordingly, the control of that operating element. Furthermore, the pin 43 may be implemented in different manners and, for example, be a rolling element or small roller. Such a pin 43 can be used on one side or on both sides.

FIG. 4, showing a side elevational view of the conveyor 1, more particularly reflects the rest position S1 and the carrying position S2 as well as the manner in which these positions S1, S2 are taken up. To that end, the conveyor according to the present example comprises a control in the form of a guide assembly 5 with a rest position guide 502 and a carrying position guide 501.

The configuration in this case is such that without external operation the flight 4 by gravity, rotating freely, rotates counterclockwise downwards and in a particular position will hang down, that is, with a flight center of gravity under a center of a respective pivotal axis (i.e. shaft hole 44a). The example comprises a depicted rest position guide 502 (to engage, to steer the operating element 3) which is arranged, on the one hand, to ensure a downward rotation at the right time, also when, for instance by soiling around the pivots or bending of the threshold 41, the rotation is hindered, and, on the other hand, to avoid unintended upward displacement. In this manner the flight 4 is moved in a substantially fixed orientation in the rest position S1, at least along the parts of the transport path where this is desired (in this case the substantially horizontal parts of the transport path). Where the rest position guide 502 ends, there begins (viewed in the transport direction T) the carrying position guide 501 which guides the flight 4 upwards by the pin 43 (by operation of this pin 43) and likewise provides a fixed upwardly moved orientation for the flight 4 along a desired part of the transport track (in this example an inclined part as mentioned). Furthermore, in FIG. 4 it is clearly represented how the threshold 41 is configured to move closely between successive rollers 2 (at least, through a narrow gap present between those rollers 2). To this end, the threshold 41 can comprise, for instance, a slightly bent threshold blade.

FIG. 5 shows in isometric view the flight 4 (for instance when not mounted). As already mentioned hereinbefore, the flight 4 at both ends thereof has brackets 42 *a,b*, shaft holes 44 *a,b*, stops 45 *a,b*, and open shaft slots 46 *a,b*. In the depicted embodiment, only a single pin 43 is shown. This component can also be used at both ends.

Furthermore, it is noted that during use, during travel of the conveyor 1 to convey packaging units, the flights 4 at transition B (as represented in FIG. 1) are moved up relative to the transport surface V. The packaging units placed on the transport surface V are then carried along over the incline BC, either because they roll back down to some extent and are stopped by a flight 4, or because they are placed on a flight 4 which, upon rising, generates sufficient resistance for the packaging unit not to roll down as well. If this last does happen, a more upstream packaging unit that has already been stopped will stop it and thus the pair formed will also be carried along. It will be appreciated that the flights 4 are so configured that the thresholds do not project too far up from the surface, thereby entailing the risk of the packaging units, e.g. egg boxes, being damaged or opened, and also that the intermediate distances between the flights 4 are chosen such that 'doubles' as mentioned above will occur comparatively rarely.

To one skilled in the art, it will be clear that the invention is not limited to the exemplary embodiment described. Various modifications are possible within the purview of the invention as set forth in the appended claims.

KEY TO SYMBOLS

| ABCD... | transport path | 31 | slot |
|---|---|---|---|
| V | transport surface | 4 | flight |
| T | transport direction | 41 | threshold |
| S1 | rest position | 42 a, b | bracket |
| S2 | carrying position | 43 | pin |
| 1 | endless conveyor | 44 a, b | bush hole |
| 2 | freely rotating supporting rollers | 45 a, b | stop |
| | | 46 a, b | open bush slot |
| 2a | roller shaft | 5 | guide assembly |
| 20a, b | shaft holder | 502 | rest position guide |
| 21a, b | shaft hole | 501 | carrying position guide |
| 22a, b | bush | | |
| 3 | conveyor element, link | | |

The invention claimed is:

1. An endless conveyor for transporting products along a transport path in a transport direction T, wherein the conveyor comprises, freely rotating supporting rollers which extend substantially perpendicular to the transport direction, which are connected at both ends to conveyor elements, and which form a transport surface, and flights, connected to the conveyor at well-defined positions, which with a control are movable to and away from a carrying position above said transport surface, wherein, after such carrying position has been taken up, a product present on the transport surface is carried along in the transport direction T, wherein the flights comprise strip-shaped thresholds which, from a rest position below at least said transport surface, can be moved up between the rollers to said carrying position; wherein neighboring rollers are spaced a relatively short distance from each other, viewed in the transport direction T, thereby defining a narrow intervening gap, the relatively short distance being less than an outer diameter of the rollers, wherein the threshold is movable through that gap between the rest position and the carrying position.

2. The endless conveyor according to claim 1, wherein the transport path comprises at least a single inclined path.

3. The endless conveyor according to claim 1, wherein the thresholds are rotatably connected to the conveyor elements via brackets.

4. The endless conveyor according to claim 3, wherein each threshold is rotatably connected to the conveyor elements via two brackets, wherein on at least one of the two brackets a projection is arranged which extends substantially parallel to said transport surface.

5. The endless conveyor according to claim 4, wherein the projection comprises a rolling element.

6. The endless conveyor according to claim 4, wherein the control comprises a guide for guiding said projection for moving between the rest position and the carrying position.

7. The endless conveyor according to claim 1, wherein the conveyor is provided with conveyor elements which form coupling pieces between, on the one hand, endless drive elements and, on the other hand, the rollers and the flights.

8. The endless conveyor according to claim 7, wherein at least a number of the conveyor elements are provided with shaft holders for receiving roller shafts in shaft holes, and bushes for bush holes of flights.

9. The endless conveyor according to claim 8, wherein outer sides of said shaft holders or associated shaft bushes function as a stop for determining at least an end position of a threshold.

10. The endless conveyor according to claim 1, wherein a threshold is provided with a slightly bent threshold blade.

11. The endless conveyor according to claim 1, wherein neighboring rollers define a narrow gap through which a part of a threshold is movable.

12. The endless conveyor according to claim 1, wherein the products are packaging units.

13. The endless conveyor according to claim 1, wherein the conveyor is provided with conveyor elements which form coupling pieces between, on the one hand, endless chains and, on the other hand, the rollers and the flights.

14. An endless conveyor for transporting products along a transport path in a transport direction T, wherein the conveyor comprises, freely rotating supporting rollers which extend substantially perpendicular to the transport direction, which are connected at both ends to conveyor elements, and which form a transport surface, and flights, connected to the conveyor at well-defined positions, which with a control are movable to and away from a carrying position above said transport surface, wherein, after such carrying position has been taken up, a product present on the transport surface is carried along in the transport direction T, wherein the flights comprise strip-shaped thresholds which, from a rest position below at least said transport surface, can be moved up between the rollers to said carrying position,
wherein the conveyor is provided with conveyor elements which form coupling pieces between, on the one hand, endless drive elements and, on the other hand, the rollers and the flights,
wherein at least a number of the conveyor elements are provided with shaft holders for receiving roller shafts in shaft holes, and bushes for bush holes of flights,
wherein each flight comprises brackets by which the flight is pivotably connected to a conveyor element, wherein the flight rotates freely by gravity, and in a particular downwards position hangs down, with a flight center of gravity under a center of a respective pivotal axis.

15. An endless conveyor for transporting products along a transport path in a transport direction T, wherein the conveyor comprises,
   freely rotating supporting rollers which extend substantially perpendicular to the transport direction, which are connected at both ends to conveyor elements, and which form a transport surface,
   flights, connected to the conveyor at well-defined positions, which with a control are movable to and away from a carrying position above said transport surface, wherein, after such carrying position has been taken up, a product present on the transport surface is carried along in the transport direction T, wherein the flights comprise strip-shaped thresholds which, from a rest position below at least said transport surface, can be moved up between the rollers to said carrying position, wherein the thresholds are rotatably connected to the conveyor elements via brackets, and
wherein a projection is arranged on at least one of the brackets which extends substantially parallel to said transport surface.

16. The endless conveyor according to claim 15, wherein the projection comprises a rolling element.

17. The endless conveyor according to claim 15, wherein the control comprises a guide for guiding said projection for moving between the rest position and the carrying position.

18. An endless conveyor for transporting products along a transport path in a transport direction, comprising:
   freely rotating supporting rollers which extend substantially perpendicular to the transport direction, which are connected at both ends to conveyor elements, and which form a transport surface,
   flights members connected to the conveyor at a plurality of positions along the conveyor, the flights extending longitudinally across the conveyor parallel to the rollers, and
   the connections of each flight to the conveyer permitting that flight to be located in a rest position at least partially below the rollers and to be movable through a space between the rollers to a carrying position whereat the top of the flights extend above the transport surface of the rollers to a height whereat the flights can engage a product being carried on the conveyor.

19. The endless conveyor according to claim 18, wherein the flights are rotatably connected to the conveyor by brackets which are rotatably connected to the conveyor so as to be pivotable between said rest position and said carrying position.

20. The endless conveyor according to claim 19, including a projection on at least one of the brackets, and a guide located below the rollers which is shaped to move the projection, and hence the bracket, from the rest position to the carrying position.

* * * * *